US012564832B2

(12) United States Patent
Mottier et al.

(10) Patent No.: US 12,564,832 B2
(45) Date of Patent: Mar. 3, 2026

(54) SEALED DOUBLE-DOOR CONNECTION DEVICE WITH REINFORCED SECURITY

(71) Applicant: GETINGE LIFE SCIENCE FRANCE, Vendôme (FR)

(72) Inventors: Emmanuel Mottier, Aze (FR); Thierry Auguin, Saint-Ouen (FR)

(73) Assignee: GETINGE LIFE SCIENCE FRANCE, Vendôme (FR)

( * ) Notice: Subject to any disclaimer, the term of this patent is extended or adjusted under 35 U.S.C. 154(b) by 150 days.

(21) Appl. No.: 18/568,705

(22) PCT Filed: Jun. 8, 2022

(86) PCT No.: PCT/FR2022/051091

§ 371 (c)(1),
(2) Date: Jan. 31, 2024

(87) PCT Pub. No.: WO2022/258926

PCT Pub. Date: Dec. 15, 2022

(65) Prior Publication Data

US 2024/0278228 A1 Aug. 22, 2024

(30) Foreign Application Priority Data

Jun. 11, 2021 (FR) ....................................... 2106197

(51) Int. Cl.
*B01L 1/02* (2006.01)

(52) U.S. Cl.
CPC ......... *B01L 1/02* (2013.01); *B01L 2200/0689* (2013.01); *B01L 2200/145* (2013.01)

(58) Field of Classification Search
CPC ............... B01L 1/02; B01L 2200/0689; B01L 2200/145; F16J 13/18
(Continued)

(56) References Cited

U.S. PATENT DOCUMENTS 2,816,683 A * 12/1957 Miers ........................ E05C 3/14
220/314
4,494,586 A * 1/1985 Picard ..................... G21F 7/005
976/DIG. 356
(Continued)

FOREIGN PATENT DOCUMENTS

FR 2 441 244 A1 6/1980
FR 2 695 343 A1 3/1994
(Continued)

OTHER PUBLICATIONS

International Search Report for corresponding International Application No. PCT/FR2022/051091 mailed Oct. 7, 2022.

*Primary Examiner* — Nathan Cumar
(74) *Attorney, Agent, or Firm* — McDonald Hopkins LLC

(57) ABSTRACT

A sealed connection device for a double-door connection system comprising a first flange and a first door closing off the first flange, the first flange comprising bayonet connection for connecting an object, the object comprising a second flange closed off by a second door, the second flange being provided with n lugs intended to engage with the bayonet connection of the first flange, the first flange comprising n detectors of the correct assembly of the lugs of the second flange in the bayonet connection, each detector being configured to detect the presence of a lug.

10 Claims, 6 Drawing Sheets

(58) Field of Classification Search
USPC ........................ 292/256.5; 141/388, 384, 386
See application file for complete search history.

(56) References Cited

U.S. PATENT DOCUMENTS

| | | | | |
|---|---|---|---|---|
| 4,570,816 | A * | 2/1986 | Ferris | B65D 90/10 220/314 |
| 4,622,902 | A * | 11/1986 | Miller | F16J 13/20 292/DIG. 60 |
| 4,684,491 | A * | 8/1987 | Rylatt | F16L 55/10 292/256.69 |
| 4,889,056 | A * | 12/1989 | Stewart | B61D 17/16 220/314 |
| 4,928,615 | A * | 5/1990 | Williams | E05C 9/10 114/201 R |
| 4,941,695 | A * | 7/1990 | Miller | F16J 13/24 292/259 R |
| 4,944,233 | A * | 7/1990 | Dugge | B61D 7/00 220/244 |
| 4,948,185 | A * | 8/1990 | Miller | F16J 13/18 292/256.5 |
| 5,396,692 | A * | 3/1995 | Floyd | F16F 1/22 29/230 |
| 5,421,626 | A * | 6/1995 | Glachet | F16J 13/18 292/241 |
| 5,660,295 | A * | 8/1997 | Hroma | B65D 90/10 215/315 |
| 5,700,043 | A * | 12/1997 | Rohard | G21F 7/005 292/161 |
| 6,095,365 | A * | 8/2000 | Yielding | F16J 13/22 105/377.07 |
| 6,109,823 | A * | 8/2000 | Halferty | B65D 90/10 220/323 |
| 6,591,662 | B1 * | 7/2003 | Grimard | G01M 3/2869 73/49.8 |
| 8,066,140 | B1 * | 11/2011 | Young | E05C 3/042 292/256.5 |
| 8,297,463 | B2 * | 10/2012 | McQuaid | F16J 13/20 220/817 |
| 8,540,103 | B2 * | 9/2013 | Lollis | F16J 13/24 292/256.5 |
| 8,596,697 | B1 * | 12/2013 | Haibel | F16J 13/18 292/256.5 |
| 8,950,618 | B2 * | 2/2015 | Degutis | F16J 13/18 292/241 |
| 9,440,229 | B2 * | 9/2016 | Nodin | C12M 37/04 |
| 2004/0108660 | A1 * | 6/2004 | Frew | F16J 15/122 277/628 |
| 2011/0192848 | A1 * | 8/2011 | Lollis | F16J 13/08 220/315 |
| 2014/0291995 | A1 * | 10/2014 | Chavrot | G21F 7/005 976/DIG. 362 |
| 2016/0201382 | A1 * | 7/2016 | Dufour | E05C 19/00 49/68 |
| 2016/0208527 | A1 * | 7/2016 | Dufour | G21F 7/005 |
| 2016/0281418 | A1 * | 9/2016 | Dufour | B01L 1/02 |
| 2018/0274284 | A1 * | 9/2018 | Bartha | E06B 3/38 |
| 2019/0218025 | A1 * | 7/2019 | Craig | B65D 90/10 |
| 2020/0065959 | A1 * | 2/2020 | Shartle | B01L 3/502715 |
| 2022/0397195 | A1 * | 12/2022 | Felix | G21F 7/005 |

FOREIGN PATENT DOCUMENTS

| | | |
|---|---|---|
| WO | 2013/053844 A1 | 4/2013 |
| WO | 2016/131851 A1 | 8/2016 |

* cited by examiner

SEALED DOUBLE-DOOR CONNECTION DEVICE WITH REINFORCED SECURITY

TECHNICAL FIELD AND PRIOR ART

The present invention relates to a double-door connection device with reinforced security.

In a certain number of industrial sectors, among which are the nuclear, medical, pharmaceutical and agri-food sectors, it is necessary or desirable to carry out certain tasks in a confined atmosphere, in order to either protect the environment, for example from radioactivity, from toxicity, etc., or on the contrary be able to carry out these tasks in an atmosphere that is aseptic or devoid of dust, or finally both simultaneously.

The transfer of apparatuses or of products from one closed volume to the other, without at any time the sealing of each of these volumes with respect to the outside being broken, poses a complicated problem to solve. This problem can be solved by a double-door connection device.

Such a double-door device provided with control with multiple securities is for example known from the document FR 2 695 343. Each volume is closed by a door mounted in a flange. Each door is rigidly connected to its flange either by a bayonet link, or by a hinge and a locking system and the two flanges are intended to be rigidly connected to one another by a bayonet link.

For example one of the closed volumes is formed by an isolator and the other volume is formed by a flexible container, also called sealed transfer bag.

Conventionally the connection part carried by the isolator is designated as the alpha part and the connection part carried by the container is designated as the beta part.

Joints are provided on the alpha part and on the beta part to ensure the sealing between the connected volumes.

The beta part includes a beta flange closed by a beta door, the beta flange and the beta door cooperating with one another by a bayonet link, and the alpha part includes an alpha flange closed by an alpha door, the alpha door being articulated on the alpha flange by a hinge. The sealing between the beta flange and the beta door is ensured by a joint housed in the beta flange.

The connection between the transfer bag and the chamber is carried out by mechanical cooperation of the beta flange and of the alpha flange by a link of the bayonet type. This mechanical cooperation provides both the mechanical rigid connection and the sealing of the connection.

The sealed connection cycle is the following:

The container carrying the beta part is moved closer to the alpha part, the lugs of the beta flange penetrate into notches of the alpha flange, and the lugs of the beta door penetrate into notches of the alpha door. The container is pivoted, for example in the clockwise direction, the lugs of the beta flange pivot and slide in a groove of the alpha flange. Simultaneously, because of the friction of the joint carried by the beta flange, the rotation of the container causes the rotation of the beta door, which causes the connection between the beta door and the alpha door by the bayonet link. The two doors are thus rigidly connected. Each lug of the beta door thus bears against a circumferential stop carried by the alpha door.

The container is again pivoted, because of the bearing of the lugs of the beta door against the circumferential stops on the alpha door, the rotation of the container causes the disconnection between the beta door and the beta flange.

According to the joints, one carried by the beta flange and the other carried by the alpha door, the following alternative is possible:

Simultaneously to the pivoting and to the sliding of the lugs of the beta flange in a groove of the alpha flange, because of the friction of the joint carried by the alpha door, the beta door is maintained immobile in rotation and the beta door is disconnected from the beta flange. Each lug of the beta flange thus bears against a circumferential stop carried by the beta door.

The container is again pivoted, because of the bearing of the lugs of the beta flange against the circumferential stops on the beta door, the rotation of the container causes the rotation of the beta door, which causes the connection between the beta door and the alpha door by the bayonet link. The two doors are thus rigidly connected.

From inside the cell, the alpha door is unlocked and the assembly of the two doors can be pivoted towards the inside of the cell about the axis of the hinge.

The transfer between the two volumes can take place.

The disconnection cycle is the following:

The two doors are put back in place in the flanges.

The container is turned in the anti-clockwise direction. Because of the friction between the doors, the beta door remains immobile in rotation, which causes the connection of the beta door and of the beta flange. Then, circumferential stops carried by the beta flange bear against the circumferential stops of the beta door, causing the rotation of the beta door with respect to the alpha door and their disconnection. The container is also disconnected from the alpha flange. The container can thus be removed from the flange.

A certain number of securities is implemented to limit the risks of opening of the chamber while the container is not correctly connected to the alpha part. Such a double-door device provided with control with multiple securities is for example also known from the document EP 2 766 121. This device includes a manual control member for the opening of the doors and four locks, two of them prevent any opening manoeuvre as long as the door of the container is not present and as long as the flange of the container is not entirely connected to the alpha flange. A third lock prevents any disconnection of the two flanges after the control member passes an intermediate locking position. Finally, a fourth lock avoids the return of the control member towards its initial position when the doors are open. This double-door connection device is satisfactory. The two first locks are at least partly deactivated when the connection of one of the lugs of the beta flange on the alpha flange is detected. A protruding rod of the alpha flange is pushed back by the lug of the beta flange, which participates in the deactivation of the two locks.

The containers are transported between several zones, they can fall. Moreover, the containers are docked several times onto cells. The beta flanges can deteriorate, for example be deformed, or even break during the manipulations, in particular the connection lugs of the alpha flange which extend radially towards the outside of the flange.

The inventor has observed that if one or more of the three other lugs of the container, the presence of which is not detected, are deteriorated for example broken or deformed and the lug, the presence of which is detected, is in a sufficient state to ensure the deactivation of the locks, the lock of the cell door can be deactivated, while the connection is not necessarily secure because of the deterioration of one or of the other lugs. Indeed, this partial deterioration can result in a poor pressing of the joint against the alpha flange and thus a risk of a sealing failure, which can cause a loss of confinement.

DISCLOSURE OF THE INVENTION

It is therefore a goal of the present invention to provide a sealed double-door connection device providing an increased level of security.

The goal stated above is reached by a sealed double-door connection device that includes a cell flange and a door, the cell flange including bayonet connection means intended to cooperate with a flange of an object to be connected, the flange of the object including lugs cooperating with the bayonet connection means, said cell flange including means for detecting the presence of each of the lugs of the flange of the object to be connected.

Via the invention, any risk of unlocking of the various securities while the connection between the two flanges is not satisfactory because of one or more deteriorated lugs is eliminated.

Advantageously, the sealed connection device includes motorised unlocking means, the detection of the presence of all the lugs thus manifests itself by the sending of a signal to control means which generate an order to the unlocking means to unlock itself. Inversely, if one of the lugs is not detected, the unlocking is forbidden.

In other words, an exhaustive detection of the correct assembly of all the lugs in the bayonet connection means of the alpha flange is carried out.

For example the detection of the presence of each lug is carried out by an inductive sensor.

The object of the present invention is therefore a sealed connection device for a double-door connection system including a first flange and a first door plugging said first flange, said first flange including bayonet connection means for an object, said object including a second flange plugged by a second door, the second flange being provided with n lugs intended to cooperate with the bayonet connection means of the first flange, said first flange including n detectors of the correct assembly of the lugs of the second flange in the bayonet connection means, each detector being configured for the detection of the presence of a lug.

In an exemplary embodiment, the first flange includes for each lug a rotational stop configured to stop the second flange in rotation in a connection position, and each detector is upstream of the rotational stop in a direction of connection of the second flange onto the first flange.

Each detector can include an element configured to be moved by the presence of the lug and a sensor for detecting the movement of the element. The element can be a rod capable of sliding radially, one longitudinal end of the rod being pushed back radially towards the outside by the lug, another longitudinal end of the rod being detected by the sensor, and elastic return means exerting a stress radially towards the inside on the element.

For example, the element is metal and the sensor is an inductive sensor.

According to an additional feature, each detector includes a fastening support in which the sensor is mounted and the rod capable of sliding in the fastening support is mounted.

Advantageously, the detectors and the related electric connection means are housed in an inner volume of the first flange.

Another object of the present invention is a chamber defining a first closed volume and including a sealed connection device according to the invention, said connection device being mounted in a wall of said chamber.

The chamber can include a control unit to which the detectors are connected.

In an exemplary embodiment, the chamber can include motorised means for locking/unlocking the first door and motorised means for opening the first door connected to the control unit, said control unit being configured, when the second flange is mounted on the first flange, to control the motorised locking means and the motorised opening means if the n detectors each send a signal of detection of a lug to the control unit.

The control unit is advantageously configured to emit an alert message if one of the detectors does not send a signal of detection of a lug.

The object can be a container or a flexible bag.

BRIEF DESCRIPTION OF THE DRAWINGS

The present invention will be better understood from the following description and the appended drawings in which.

DETAILED DISCLOSURE OF SPECIFIC EMBODIMENTS

In the following description, the expressions “cell door” and “alpha door” are synonymous, the expressions “container door” and “beta door” are synonymous, the expressions “cell flange” and “alpha flange” are synonymous and the expressions “container flange” and “beta flange” are synonymous.

In the following description, the beta flange is that of a container intended to be connected in a sealed manner to an alpha flange with a view to the transfer of objects between the inside of the container and the inside of the cell. It is understood that the connection device is adapted to the sealed connection of any object equipped with a beta flange, for example these can be flexible bags, gloves, sleeves, a half-protective suit, etc.

Figure 1:
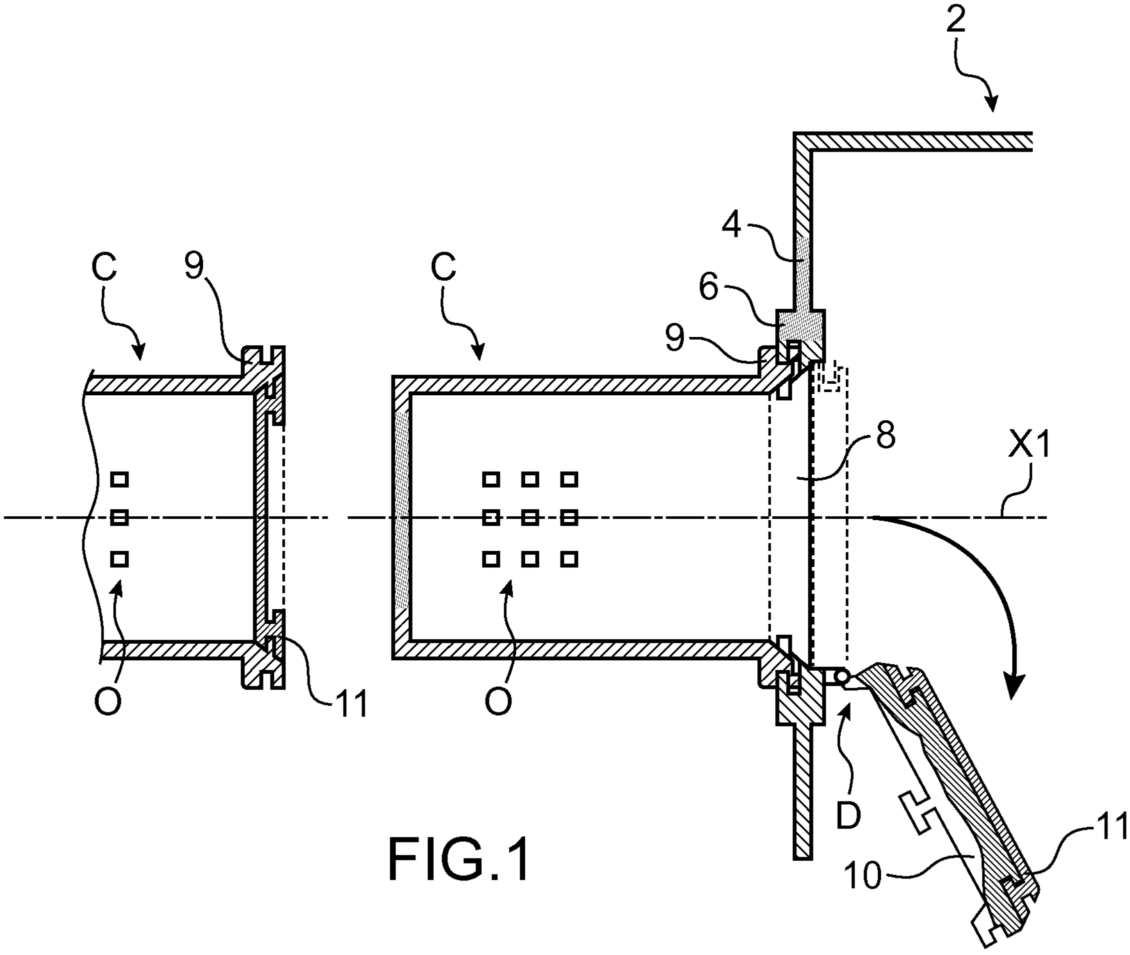
FIG. 1 is a diagram of a top cross-sectional view of a chamber provided with a sealed connection device to which a container is connected.

FIG. 1 shows a diagram of a double-door sealed transfer system in which a sealed connection device according to the invention can be implemented.

In general the double-door transfer system has a symmetry of revolution around the axis X1 which is the axis of the cell flange.

In the following description the two closed volumes that it is desired to connect correspond respectively to an isolator 2 or cell and to a container C. In this example, the container includes a rigid containing part. Alternatively, it includes a flexible containing part.

The chamber 2 includes walls defining a sealed volume. At least one of the four walls 4 includes a device D for sealed connection to an outside sealed system, for example another chamber, a rigid or flexible container, of the bag type. The device D is intended to allow to connect in a sealed manner the inner volumes of the chamber and of the outside system and allow a sealed transfer between the two volumes, to protect the objects contained in the sealed volumes and/or protect the outside environment from these objects. For example, the chamber 2 can be part of an isolator system, in particular a confinement zone of the isolator, a sterile confinement zone or a radioactive confinement zone, which can be used to manufacture products in the pharmaceutical, agri-food or nuclear industry for example.

Examples of a sealed connection device are described in the document FR 2 695 343 and in the document EP 2 766 121.

The sealed connection device D includes a cell flange 6 mounted in the wall 4 of the cell and defining an opening 8, a door 10 intended to close in a sealed manner the opening 8. The sealed connection device D also includes means for connection to an outside system, for example a container C, also including a container flange 9 bordering an opening and a door 11 closing in a sealed manner this opening. The connection means of the cell flange 6 and of the flange 9 are for example of the bayonet type. Each door is connected to its flange also by a bayonet connection or by a pivot connection with a hinge. The connection device has a symmetry of revolution having an axis X1.

An example of an operating mode to connect in a sealed manner a container to the chamber will now be briefly described using FIG. 1. The closed container before its connection to the chamber is shown in dotted lines. The container contains objects O shown schematically, which it is desired to transfer into the chamber. The transfer system is not shown.

The container flange 9 is rigidly connected in a sealed manner to the flange 6 of the chamber via a bayonet connection. Simultaneously the door 11 of the container and the door 10 of the chamber are rigidly connected to one another in a sealed manner by a bayonet connection. The outer faces of the doors 10, 11 are isolated with respect to the inner volume of the container and of the chamber, the assembly formed by the two doors 10, 11 rigidly connected to one another can be removed by making it pivot about its axis, and then move into the chamber, freeing a passage between the two volumes. The two volumes are thus in communication in a sealed manner and the transfer of objects between the two volumes can be carried out via the passage.

The flange 9 of the container carries a joint that comes in contact with the outer face of the flange 6 of the chamber, this joint participates in the definition of the passage between the two volumes.

Means (not shown) allow to control the opening and the closing of the doors 10 and 11. These means can be manual or automated as will be described in more detail in the rest of the description.

The fastening of the container door 11 onto the container flange 9 is ensured by a bayonet link. The double-door sealed transfer system also comprises two other bayonet links, to allow the rigid connection of the container flange 9 onto the cell flange 6 and the rigid connection of the container door 11 onto the cell door 10. The three bayonet links are arranged so that after docking of the container flange 9 on the cell flange 6, a rotation of the container C about its axis, for example in the clockwise direction, has the effect of rigidly connecting the container flange 9 and the cell flange 6, of rigidly connecting the container door 11 and the cell door 10, and of disconnecting the container door 11 from the container flange 9. In one operating mode, these two last operations are carried out consecutively, so that the opening of the container only occurs after the container door 11 has been rigidly connected to the cell door 10 to form a double door.

The assembly formed by the cell flange and the cell door is routinely designated as “alpha part”.

The assembly formed by the container flange 9, the container door 11 and the joint mounted on the flange 9, and which ensures both the sealing between the flange and the container door 11 and between the cell flange 6 and the container flange 9, is routinely designated as “beta part”.

The transfer container thus includes a beta connection part and a container.

Figure 2A:
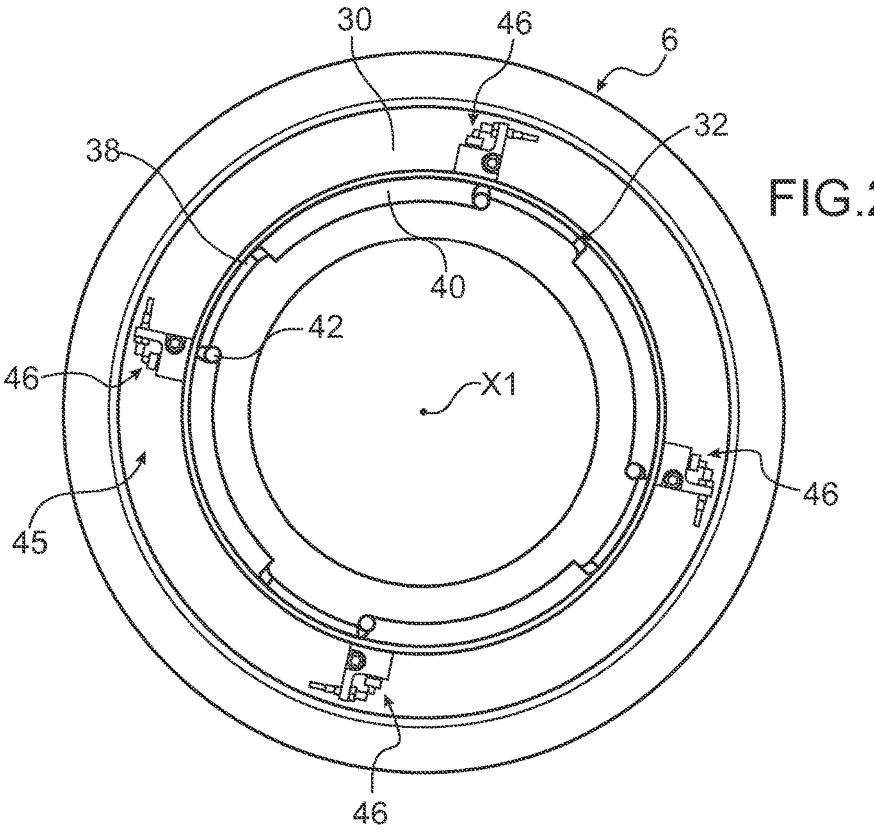
FIG. 2A is a detail view of the inside of a cell flange of a double-door connection device.
Figure 2B:
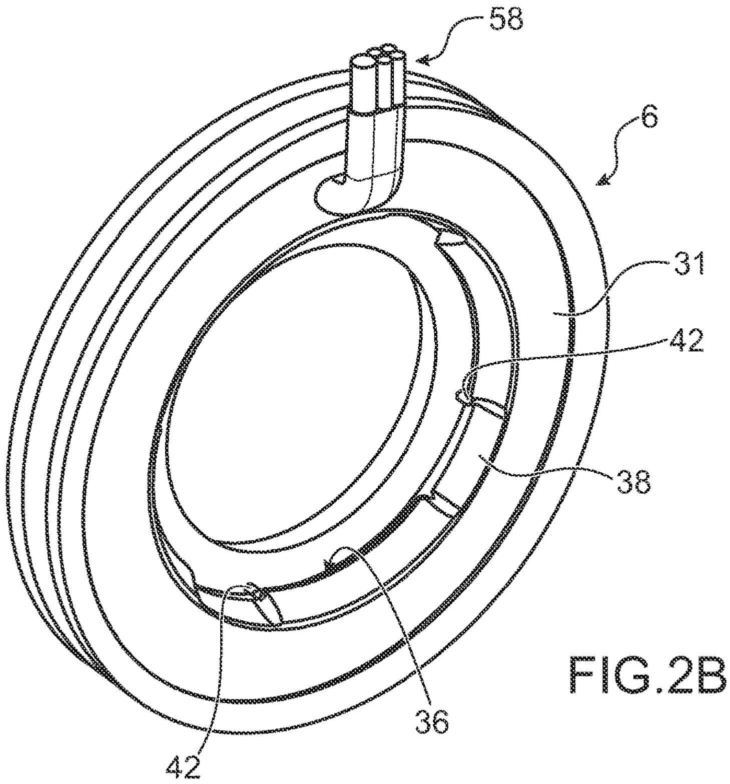
FIG. 2B is a view of the flange of FIG. 2A, the inner volume being closed by a cover.

FIG. 2A shows an inner volume 30 of a cell flange 6 or alpha flange according to an exemplary embodiment. Advantageously, this volume 30 is located inside the flange and oriented towards the outside of the cell. It is closed by a protective cover 31 (FIG. 2B). Thus as will be described below, the detectors 46 and the related electric connection means 58 are housed in the inner volume 30, they do not represent an additional bulk at the surface bothering the operator.

Figure 3:
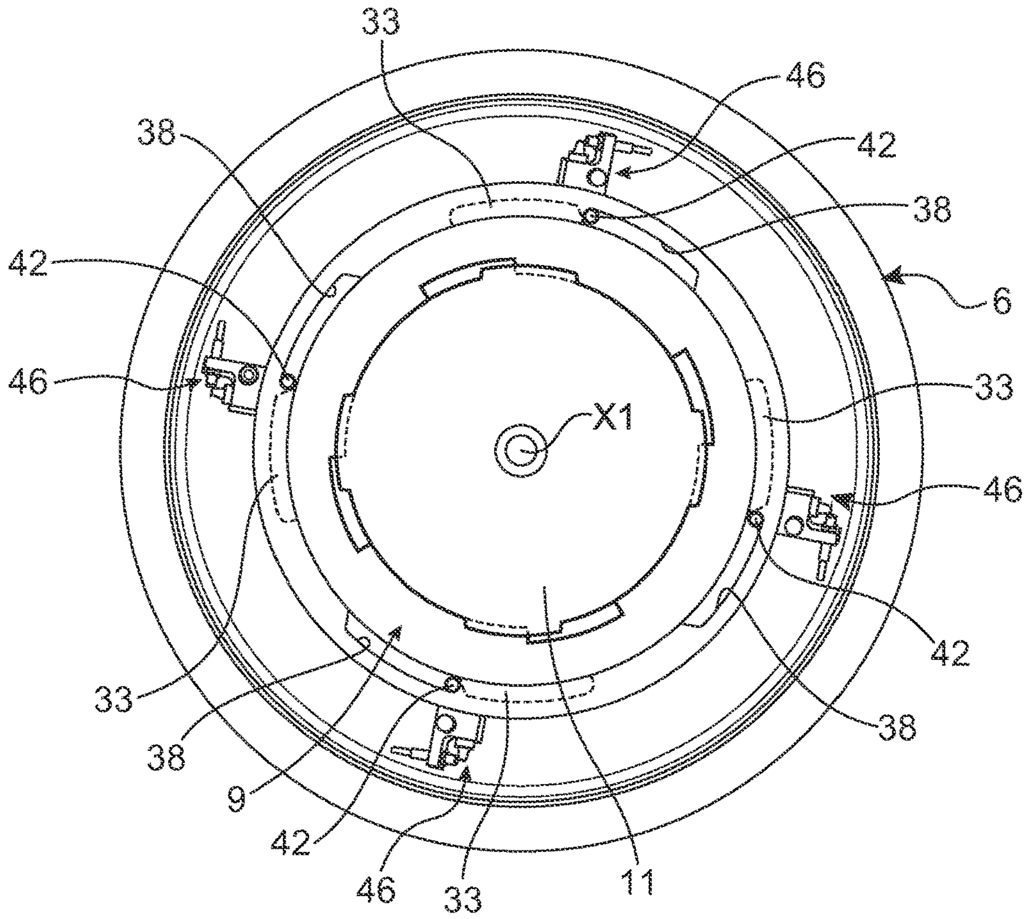
FIG. 3 is a transparent view of the connection device onto which a container is connected, only the flange of the container and its door being shown.

The flange 6 includes bayonet connection means 32 configured to cooperate with lugs 33 of the container flange 9. In FIG. 3, the lugs 33 extending radially towards the outside of the container flange 9 are visible. In this example, the container flange includes four lugs. Alternatively it includes three lugs or more than four lugs.

Figure 4:
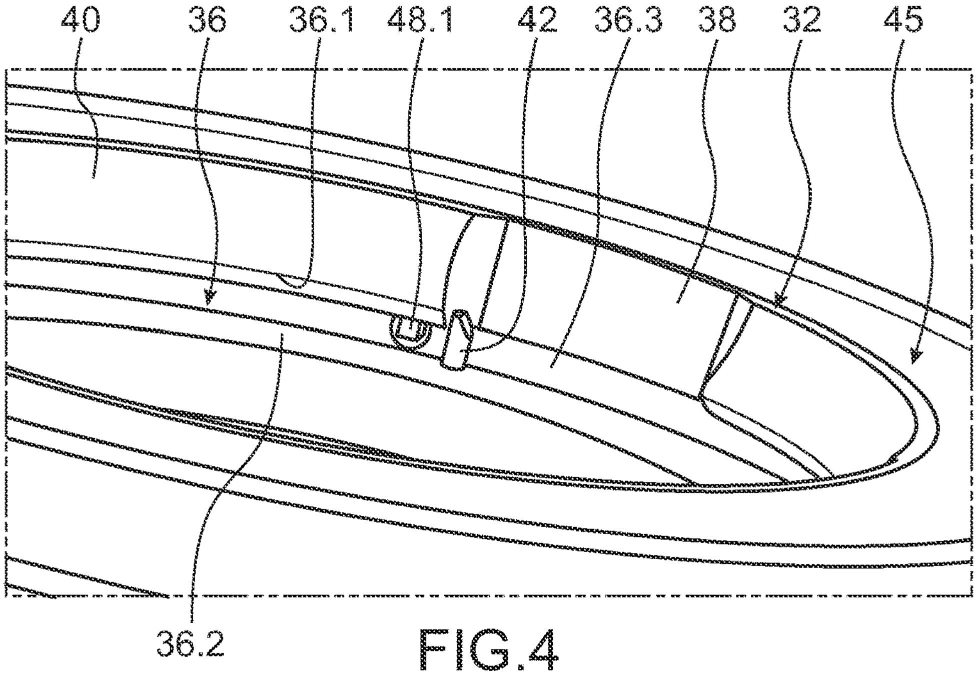
FIG. 4 is a perspective view of the cell flange of FIG. 2A showing the inside of the radial groove for mounting the lugs.
Figure 5:
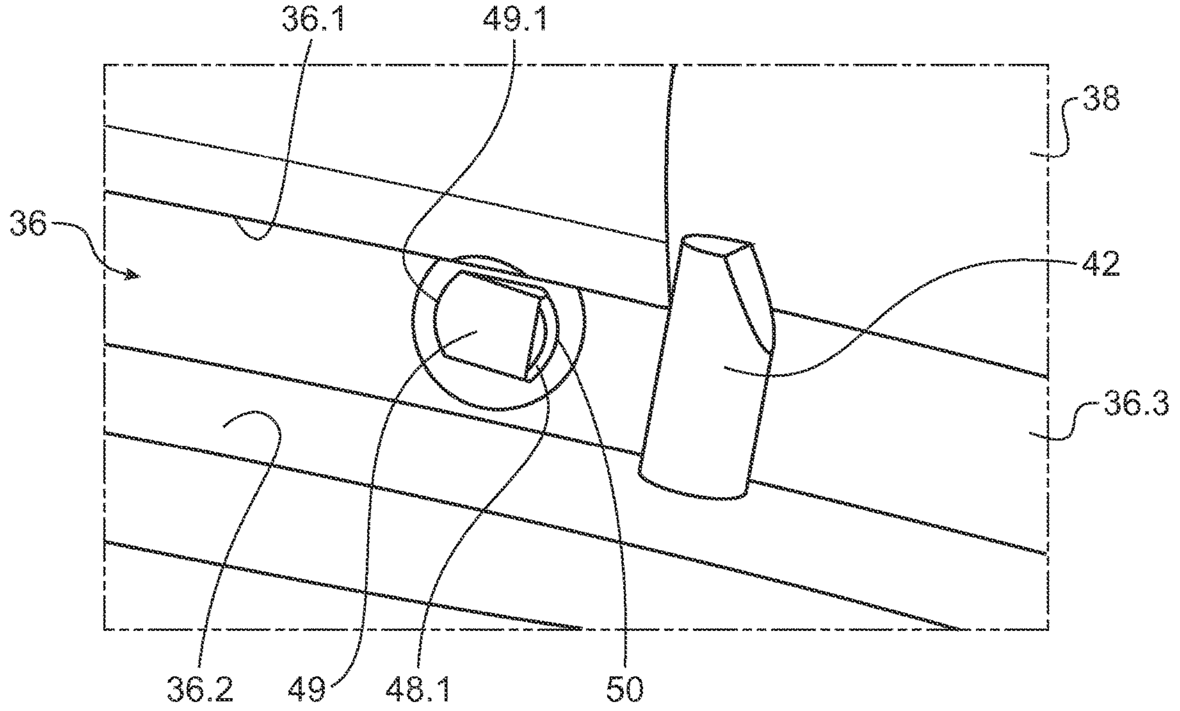
FIG. 5 is a detail view of FIG. 4.

In FIGS. 4 and 5, the bayonet connection means 32 including a radial groove 36 opening radially towards the central passage of the cell flange are visible. The radial groove 36 is defined by two lateral walls 36.1, 36.2 and a bottom 36.3. The lateral walls are substantially perpendicular to the axis of the cell flange 6 and the bottom 36.3 extends axially around the longitudinal axis X1. The lateral wall 36.1, located upstream with respect to the direction of insertion of the container flange into the cell flange, includes radial notches 38 distributed angularly around the longitudinal axis X1. The radial notches 38 are disposed and dimensioned so as to allow the passage of the lugs 33 in the groove and their insertion into the groove.

The radial notches 38 are separated by portions of an arc of a circle 40 forming axial stops for the lugs 32.

Figure 6:
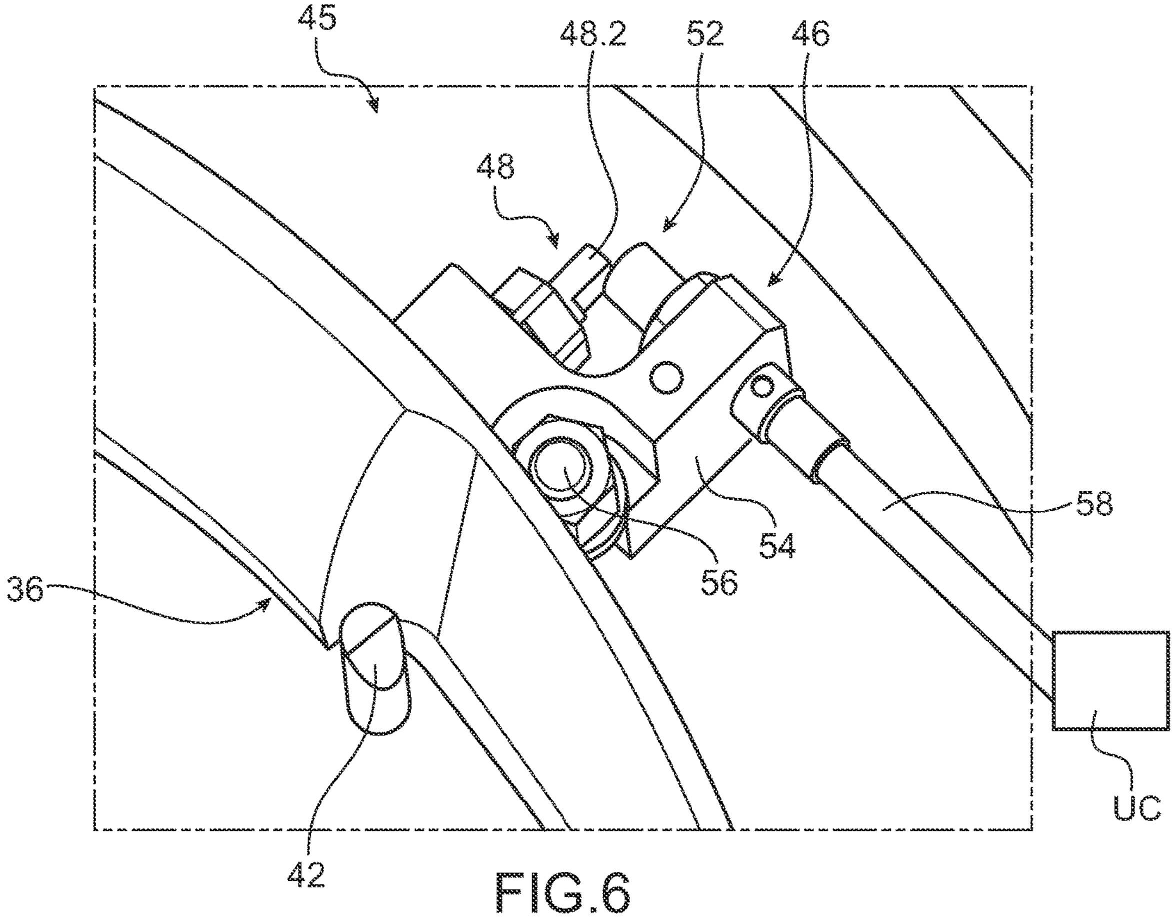
FIG. 6 is a perspective view of the cell flange of FIG. 2A showing one of the detectors that can be implemented.

The cell flange also includes rotational stops 42 (FIGS. 4 to 6) disposed in the radial groove 36 and limiting the movement in rotation of the lugs 33 around the axis X1 in a direction of rotation of connection of the container flange 9 in the cell flange 6. In the example shown and preferably, each rotational stop 42 is located at an angular end of each radial notch 38, so as to be located downstream of the lug intended to be stopped against it in the connection phase.

The cell flange 6 also includes a circular groove 45 (FIG. 6) having an axis X1 defining the inner volume 30 and surrounding the radial groove 36. The bottom 36.3 of the groove 36 forms the radially inner wall of the groove 45.

The cell flange 6 also includes detectors 46 of the presence of each of the lugs 33 of the container flange in the groove 36.

The cell flange 6 thus includes as many detectors 46 as lugs of the container flange. In the example shown, the cell flange includes four detectors 46. Each detector 46 is mounted on the cell flange, upstream of a rotational stop 42. The detectors 46 are mounted in the inner volume 30 of the cell flange, on the outer side of the chamber.

Since the four detectors 46 are similar, as well as their mounting in the cell flange, only one of them will be described in detail.

In this example, the detector 46 includes a detection element formed by a rod 48 mounted in a bore 50. The rod 48 terminates by one end 48.1 in the radial groove 36 and by another end 48.2 in the circular groove 45. In this example, the groove 50 is oriented radially. The rod 48 is mounted to slide in the bore 50. The first longitudinal end 48.1 in the rest state, i.e. in the absence of a lug, protrudes into the radial groove 36.

The first end 48.1 of the rod 48 is intended to be in contact with a radially outer end of a lug 33 of the container flange 9 and forms a feeler. Preferably the feeler 48.1 has a bevelled face 49 facilitating its cooperation with the lug 33. The bevelled face 49 has a leading edge 49.1 with which the lug comes in contact during its rotation. In the rest state, the leading edge 49.1 is flush with the bottom 36.3 of the radial groove.

Figure 7A:
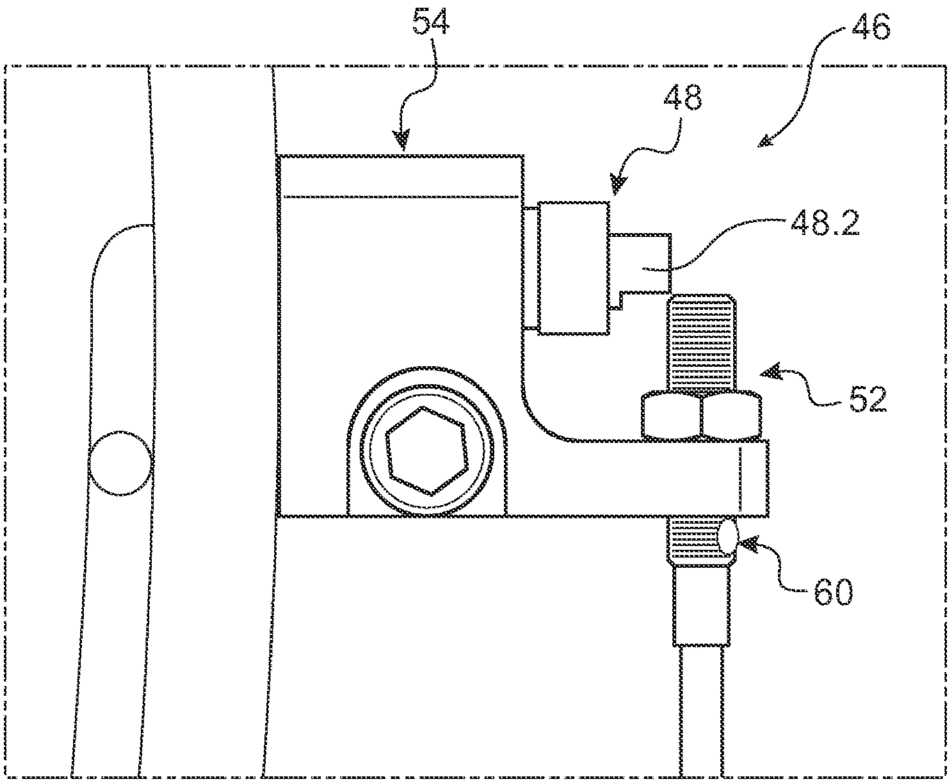
FIG. 7A
Figure 7B:
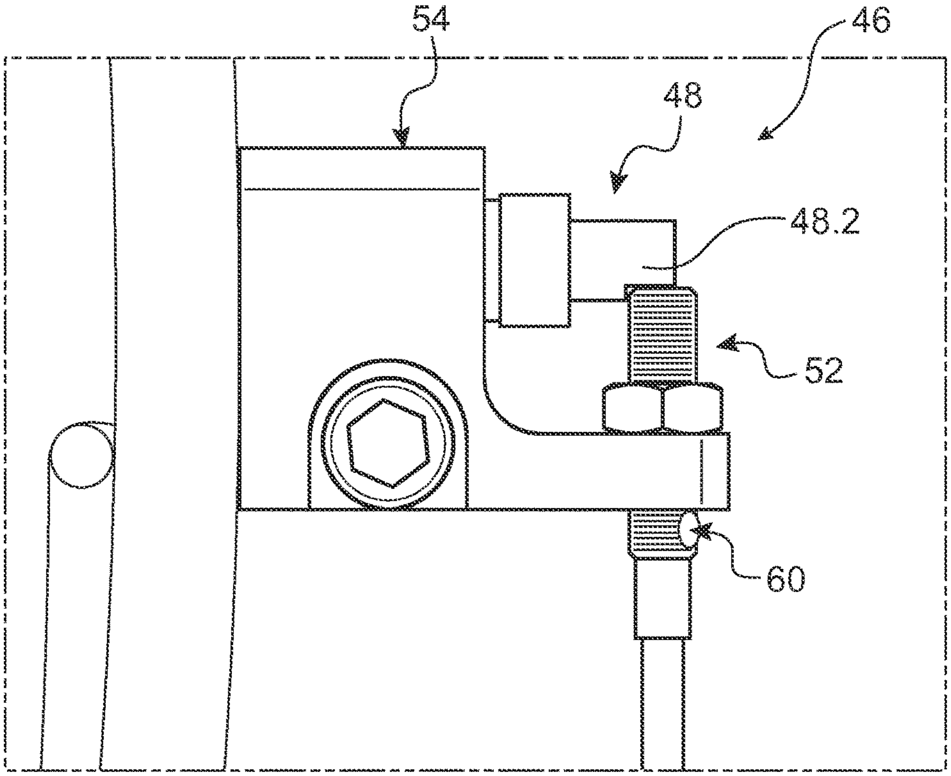
FIG. 7B are top views of the detector of FIG. 6 in two different states.

The second end 48.2 of the rod 48 opens into the circular groove 45 and is intended to be detected by a sensor 52 fastened in the circular groove 45 of the cell flange. In the example shown, the sensor is disposed substantially perpendicularly to the rod. The end 48.2 moves between a rest position, in which it is not detected by the sensor (FIG. 7A), and a detection position, in which it is detected by the sensor (FIG. 7B). Another relative orientation of the sensor 52 and of the rod 48 does not go beyond the context of the present invention. The end 48.2 advantageously includes a flat section facing the inductive sensor 52 to offer a flat surface facing the inductive sensor 52 and not a generatrix of a cylinder.

In this example, the sensor 52 is an inductive sensor and the rod 48 or at least its second end 48.2 is made of a metal material detectable by the inductive sensor. When the end 48.2 of the rod is facing the sensor (FIG. 7B), it modifies the magnetic field generated by the sensor, this modification is detected.

In the example shown, the sensor 52 is mounted in a fastening support 54 fastened onto the cell flange 6 and the rod 48 is also mounted to slide in the fastening support 54. In this example, the fastening support 54 has the overall shape of an L, one branch of the L carrying the sensor and the other branch carrying the rod 48. The fastening support 54 is for example fastened onto the flange via a screw 56. The implementation of a fastening support 54 rigidly connecting the sensor and the rod 48 allows simultaneous and facilitated mounting of the sensor 52 and the rod 48 on the flange 6, for example via a single screw. Moreover, their relative orientation is set by the fastening support.

Means for elastic return to the rest position are provided (not shown). They are for example formed by a helical spring mounted in the fastening support or between the fastening support 54 and the bottom of the radial groove 36.

The detectors described above are robust because of their simplicity. They include a single mobile element, the risk of failure are thus reduced.

In the example shown, the sensor 52 is electrically connected by a cable 58 to a power supply source G and to a control unit UC that receives and uses the signals emitted by the sensor.

Alternatively, the cable is only used for the power supply and the signals are transmitted by wireless means for example by radio wave.

Alternatively, the sensors 52 are electric switches, optical sensors implementing for example barrier or detection laser detection.

Alternatively, the detection is an only mechanical detection, in which the movements of the rod 48 resulting from the correct putting in place of the beta container cause the mechanical unlocking of the cell door. The opening of the doors is controlled elsewhere. A rod linkage system allows to recover the movements of all the rods and to transform them into an unlocking action if necessary.

Very advantageously, the sensor includes a light indicator 60 that changes illumination state according to the detection or not of the rod. Preferably, the light indicator is illuminated when the rod is detected.

Advantageously, a light visible to the operator indicates the connection state. Very advantageously, there are as many lights as sensors and thus as lugs, which allows to increase the precision of the information and to know the location of the lug or of the lugs not detected.

The four sensors are disposed at 90° from each other. If three sensors were implemented, they would generally be disposed at 120° from each other. The n sensors implemented to detect the n lugs of the container flange have the same angular disposition as the n lugs of the container flange.

In the example shown and advantageously, the means for unlocking and for actuating the opening and the closing of the doors 10 and 11 are automated. The means for unlocking and for actuating the doors include a first electric motor controlling the locking/unlocking of the cell door, and a second electric motor moving the cell door and the container door that is fastened to it about the hinge of the cell door. The control unit sends signals to the first motor to command the unlocking of the cell door, and to the second motor to command the opening of the doors. These signals are only sent if the four sensors detect the four rods. If at least one detection signal is not emitted, no unlocking nor opening is allowed. It should be noted that the presence of the container door is also detected by means provided for this purpose.

The operation of the device will now be described.

The operator moves the container flange 9 axially closer to the cell flange 6 and makes the lugs 33 of the container flange 9 penetrate into the notches 38 formed in the lateral wall 36.1 of the radial groove 36 of the cell flange 6. The axis of the cell flange and the axis of the container flange are aligned.

Figure 8:
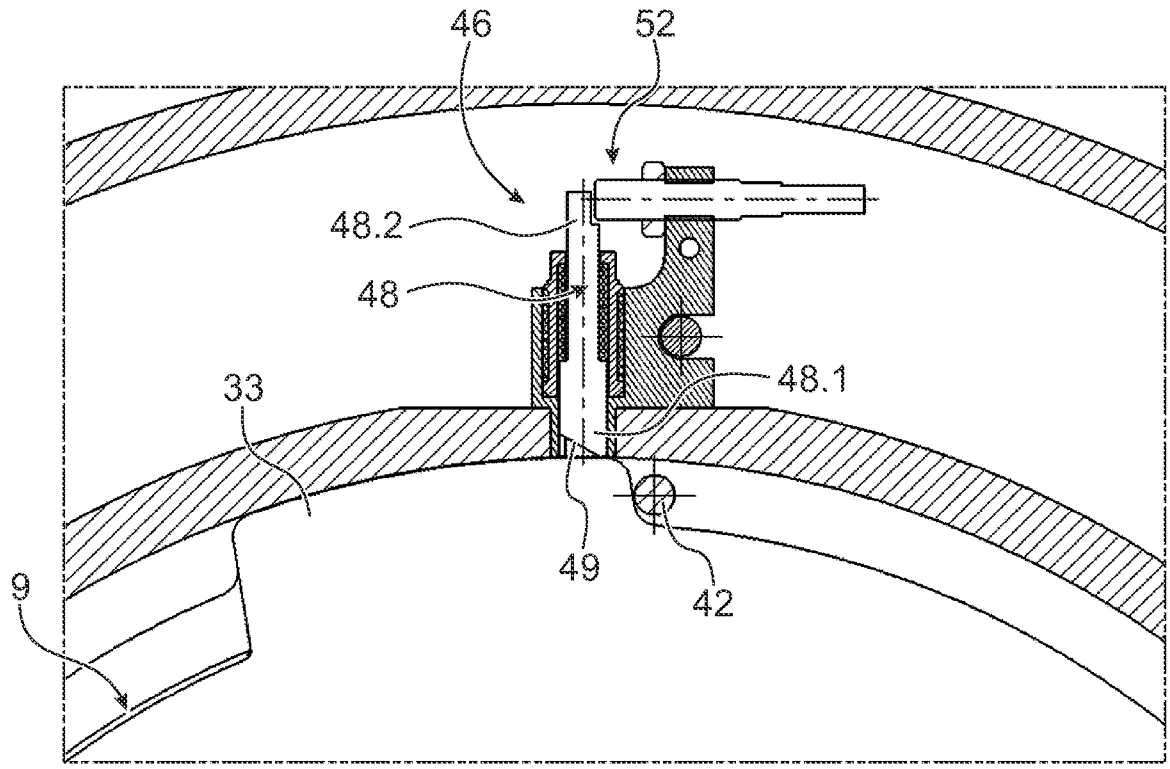
FIG. 8 is a transverse cross-sectional view of the cell flange onto which a container flange is mounted.

The operator then makes the container flange 9 pivot about its axis in the clockwise direction, the lugs 33 thus pass behind the portions of an arc 40, until each lug 33 is stopped against a rotational stop 42. Simultaneously to the approaching of the rotational stop 42, each lug of the container flange comes in contact with the feeler 48.1, the latter is thus pushed back into the bottom 36.3 of the groove 36 allowing the lug 33 to continue to pivot in the direction of the rotational stop 42 (FIG. 8). The travel of movement of the rods 48 under the action of the lugs is for example approximately 3 mm. The sliding of the rod 48 places the detection end 48.2 facing the sensor 52 (FIG. 7B). The latter emits a signal of detection of the rod 48 and thus of the lug, which is sent to the control unit. In FIG. 8, the cell flange in which the container flange is mounted is visible in cross-section.

If all the lugs are intact or if their state is sufficient to cause the sliding of the four rods, the sensors detect the movement of the rods and each emit a detection signal to the control unit (FIG. 7B), the control unit emits an order to the motor of the lock to unlock the door of the cell and to the opening motor to open the doors.

On the contrary, if the container flange includes one or more lugs that are broken or deformed so that they do not cause the sliding of the rods of the detector (FIG. 7A) and the emission of detection signals, the unlocking of the door of the cell is not authorised by the control unit. The latter can emit a failure signal for the operator.

The invention provides a high level of security since the risks of breaking the sealed atmosphere because of a defective flange are avoided.

When an event of non-detection of one or more lugs occurs, the container is scrapped or sent for repairs.

The present invention also applies to the cells in which the unlocking of the cell door and/or the opening of the cell door and of the container door are carried out manually. For example, the operator accesses the lock by using a glove mounted in a glove port located near the cell flange. In this case, it is possible for the control unit according to the signals emitted by the sensors to release a stop preventing the unlocking, which is then carried out by the operator. In one alternative, it is the operator who decides on the unlocking of the cell door according to the information sent by the detectors. If the operator detects that all the sensors emit a signal of detection of a lug, they decide to unlock the cell door, otherwise they remove the container for its scrapping or its repair.

What is claimed is:

1. A sealed connection device for a double-door connection system, the sealed connection device including a first flange and a first door configured to plug said first flange, said first flange including a bayonet connection for an object, said object including a second flange configured to be plugged by a second door, the second flange being provided with a first number of lugs intended to cooperate with the bayonet connection of the first flange, said first flange including the first number of detectors, wherein each detector of the first number of detectors is configured to detect a presence of each lug of the first number of lugs and includes an element configured to be moved by the presence of each lug of the first number of lugs and a sensor for detecting a movement of the element, wherein the element is a rod capable of sliding radially, wherein one longitudinal end of the rod is configured to be pushed back radially outwards by the lug, and wherein another longitudinal end of the rod is detected by the sensor, and wherein a spring is configured to exert a stress radially inwards on the element.

2. The sealed connection device according to claim 1, wherein the first flange includes for each lug of the first number of lugs a rotational stop configured to stop the second flange in rotation in a connection position, and wherein each detector of the first number of detectors is upstream of the rotational stop in a direction of connection of the second flange onto the first flange.

3. The sealed connection device according to claim 1, wherein the element is metal and the sensor is an inductive sensor.

4. The sealed connection device according to claim 1, wherein each detector of the first number of detectors includes a fastening support in which the sensor is mounted and the rod capable of sliding in the fastening support is mounted.

5. The sealed connection device according to one of claim 1, wherein the first number of detectors and a related number of electrical conductors are housed in an inner volume of the first flange.

6. A chamber defining a first closed volume and including a sealed connection device including a first flange and a first door configured to plug said first flange, said first flange including a bayonet connection for an object, said object including a second flange configured to be plugged by a second door, the second flange being provided with a first number of lugs intended to cooperate with the bayonet connection of the first flange, said first flange including the first number of detectors, wherein each detector of the first number of detectors is configured to detect a presence of each lug of the first number of lugs, said connection device being mounted in a wall of said chamber and includes an element configured to be moved by the presence of each lug of the first number of lugs and a sensor for detecting a movement of the element, wherein the element is a rod capable of sliding radially, wherein one longitudinal end of the rod is configured to be pushed back radially outwards by the lug, and wherein another longitudinal end of the rod is detected by the sensor, and wherein a spring is configured to exert a stress radially inwards on the element.

7. The chamber according to claim 6, including a control circuit to which each detector of the first number of detectors is connected.

8. The chamber according to claim 7, including a first motor configured to lock and unlock the first door and a second motor configured to open the first door connected to the control circuit, said control circuit being configured, when the second flange is mounted on the first flange, to control the first motor and the second motor if each detector of the first number of detectors send a signal of detection of the presence of each lug of the first number of lugs to the control circuit.

9. The chamber according to claim 7, wherein the control circuit is configured to emit an alert message if one detector of the first number of detectors does not send a signal of detection.

10. The chamber according to claim 6, wherein the object is a container or a flexible bag.

* * * * *